(12) United States Patent
Thompson et al.

(10) Patent No.: US 7,134,594 B2
(45) Date of Patent: Nov. 14, 2006

(54) PRE-PAID PURCHASING CARD AND METHOD

(76) Inventors: Daniel Thompson, 137 Thompson St., New York, NY (US) 10012; Alessandra Coradeschi, Via di S. Domenico 30, 52100 Arezzo (IT)

(*) Notice: Subject to any disclaimer, the term of this patent is extended or adjusted under 35 U.S.C. 154(b) by 119 days.

(21) Appl. No.: 10/221,768

(22) PCT Filed: Mar. 16, 2001

(86) PCT No.: PCT/EP01/03092

§ 371 (c)(1),
(2), (4) Date: Sep. 11, 2002

(87) PCT Pub. No.: WO01/69546

PCT Pub. Date: Sep. 20, 2001

(65) Prior Publication Data

US 2004/0011864 A1   Jan. 22, 2004

Related U.S. Application Data

(60) Provisional application No. 60/189,814, filed on Mar. 16, 2000.

(51) Int. Cl.
*G06K 5/00* (2006.01)
*G06K 19/00* (2006.01)
*B42D 15/00* (2006.01)

(52) U.S. Cl. .................. 235/380; 235/487; 283/57

(58) Field of Classification Search .......... 235/380, 235/382, 379, 375, 487, 492, 493; 283/57; 902/25, 26

See application file for complete search history.

(56) References Cited

U.S. PATENT DOCUMENTS

| | | | | |
|---|---|---|---|---|
| 5,251,259 | A | * | 10/1993 | Mosley ............... 713/184 |
| 6,163,771 | A | * | 12/2000 | Walker et al. ......... 705/18 |
| 6,199,757 | B1 | * | 3/2001 | Kubert ................ 235/380 |
| 2001/0042784 | A1 | * | 11/2001 | Fite et al. ............ 235/379 |

FOREIGN PATENT DOCUMENTS

| | | | | |
|---|---|---|---|---|
| FR | 2747962 | A1 | * | 10/1997 |
| FR | 2827062 | A1 | * | 1/2003 |
| FR | WO2004066223 | | * | 8/2004 |
| GB | 2252270 | A | * | 1/1991 |
| WO | WO 96/38813 | | * | 12/1996 |
| WO | WO 97/19549 | | * | 5/1997 |
| WO | WO 99/42961 | | * | 8/1999 |
| WO | WO 00/10140 | | * | 2/2000 |
| WO | WO 01/69546 | A3 | * | 9/2003 |

* cited by examiner

*Primary Examiner*—Daniel Walsh
(74) *Attorney, Agent, or Firm*—Shlesinger & Fitzsimmons

(57) ABSTRACT

A pre-paid purchasing system comprises a pre-paid purchasing card and a plurality of single use access codes on the card. Each access code is usable to authorize one payment of an amount which is subtracted from the pre-paid amount of the card. After use, an access code becomes null and void. Moreover, a method for managing purchases of goods and services from the Internet, mail-order catalogs, any merchant, etc. is proposed.

15 Claims, 3 Drawing Sheets

PRE-PAID PURCHASING CARD AND METHOD

This application is a national stage application under 35 U.S.C. §371 of PCT/EP01/03092, filed Mar. 16, 2001, and claims benefit of U.S. Provisional Patent Application Ser. No. 60/189,814 filed Mar. 16, 2000.

BACKGROUND OF THE INVENTION

This invention relates to a pre-paid purchasing system and a method for activating a transaction for purchasing goods or services from the Internet, mail-order catalogues, or other merchants. The purchasing system comprises a pre-paid card with a multiple code system, with access codes and security codes. Advantageously, access codes and security codes are stored or printed on two separate cards and the codes from each card working in conjunction with each other.

Merchants selling their products to the consumers commonly accept credit cards for the purchasing of their goods. Consumers often use their credit cards for all their purchasing needs, be it from the Internet, mail-order catalogues, or any merchant selling goods or services, who except credit cards.

Credit cards are designed to create a convenient method for the consumers to make purchases, but there are some major disadvantages to having and using a credit card. For example, when a person has their credit card stolen or loses their credit card. The owner of the lost, or stolen credit card has to call the financial institution of that credit card to report and cancel the lost, or stolen credit card. After calling the financial institution and cancelling the lost or stolen credit, that person has to wait for a new credit card to arrive from the financial institution. Which creates an inconvenience to the cardholder, if that lost or stolen credit card is their only credit card. Also, someone other than the owner of the lost or stolen credit card, making a purchase on the lost or stolen credit card, before the owner of the lost or stolen credit card can call the financial institution of that credit card to report their credit card has been lost or stolen. If a charge is made to the lost or stolen credit card, the owner of the lost or stolen credit card has to prove to the financial institution, they didn't make that particular charge.

There is no secure system to protect the consumer from having their credit card stolen and used by the person who has stolen the credit card, or from having their credit card number stolen and cloned, which can then be sold to interested parties. A high security risk area for consumers using their credit card is the Internet. When consumers enter their credit card number for the purchase they are making, their credit card number can be intercepted by a computer hacker. The stolen credit card number can be used by the person who intercepted the number, or the credit card numbers can be cloned and sold to interested parties throughout the world, and used to make numerous purchases illegally. Long before the owner of the credit card becomes aware of what has happened. The theft of credit card numbers from the Internet has long been a problem which causes a great inconvenience to the card holder. The same holds true for mail-order catalogues. Consumers using their credit card when making a purchase from mail-order catalogues, are also at risk of having their credit card number stolen and used by someone other than the owner of the credit card.

Also, some consumers who use credit cards, are at risk of spending money they don't have. With a credit card, you buy now pay later, which often leads to some consumers spending more money than they have. Which makes it very difficult for that consumer to pay their monthly credit card statement, and possibly go into debt.

On the other hand there are consumers who are limited to using cash, a money order, or writing a personal check to make a purchase, because they are without a credit card. Also, there are financial institutions that offer people with a bad credit history, credit cards, but in order for a person to obtain a credit card from these financial institutions, a person must make a deposit of money in to an account at that particular financial institution. This type of credit card is referred to as a secured credit card. With secured credit cards, comes a very high interest rate, which the person obtaining a secured credit card has to accept if they want to have a credit card.

SUMMARY OF THE INVENTION

It is an object of the present invention to obviate the aforementioned shortcomings by providing a purchasing system for purchasing goods or services (for example from the Internet, mail-order catalogues, or other merchants) with a very high level of security against theft or loss. It is another object of the invention to provide consumers without a credit card or consumers that don't want to use his own standard credit card to make purchases from the Internet or mail-order catalogues, and other merchants.

In view of objects of the invention it was thought to provide a pre-paid purchasing system comprising of a pre-paid purchasing card and a plurality of single use access codes on the card, each access code being usable to authorize one payment of an amount which is subtracted from the pre-paid amount of the card, after use an access code becoming null and void.

Also, it was thought to provide a method for activating a transaction for purchasing goods and services from the Internet, mail-order catalogs, or any merchant, comprising the steps: supplying a security code and at least a single use access code associated with a pre-paid amount; asking said single use access code and said security code or a combination of them following a request of purchase payment; authorizing said purchase payment if the single use access code and the security code are associated with amount equal or higher to amount required for the purchase payment; decreasing the amount of the purchase payment from the amount associated with said codes; marking the used single use access code for meaning that said access code has become null and void.

BRIEF DESCRIPTION OF THE DRAWINGS

To further clarify the explanation of the innovative principles of the present invention and its advantages as compared with the known prior art a possible embodiment is described below with the aid of the annexed drawings as an example apply said principles.

In the drawings.

DETAILED DESCRIPTION OF THE INVENTION

With reference to the figures there is shown schematically a preferred embodiment of a pre-paid purchasing card system of the present invention. This system comprises two pieces of code or codes: "security codes" and "single use access codes".

Figure 1:
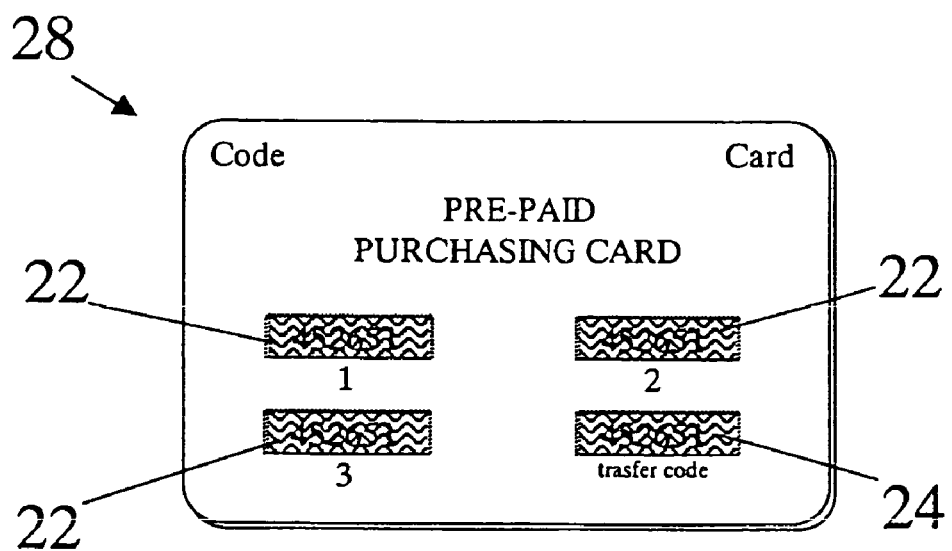
FIG. 1 shows front of a purchasing card of multiple single use code system according to the invention.

The single use access codes 22 are stored on a first card 28 (FIG. 1). Advantageously, the access codes are a plurality and each code is printed on the card and shadowed by a layer of removable scrape paint.

Each access code must be used in conjunction with the security code, which is the same for all access codes on the card. The security code and an access code can be in a combined code on the card 28 or, better, the security code can be stored or printed on a different support.

Figure 3:
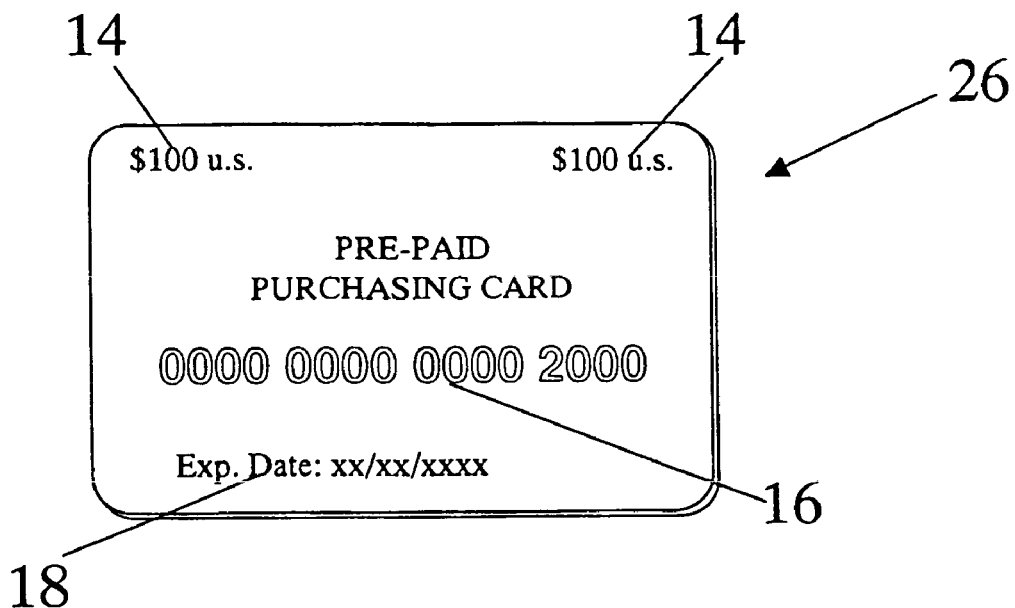
FIG. 3 shows front of support or purchasing card of the two card, multiple code system according to the invention.

Advantageously, the security code 16 can be printed on a second card 26 (FIG. 3).

The first or the second card incorporates a magnetic security strip 10 containing security information for that specific pre-paid purchasing card.

Figure 4:
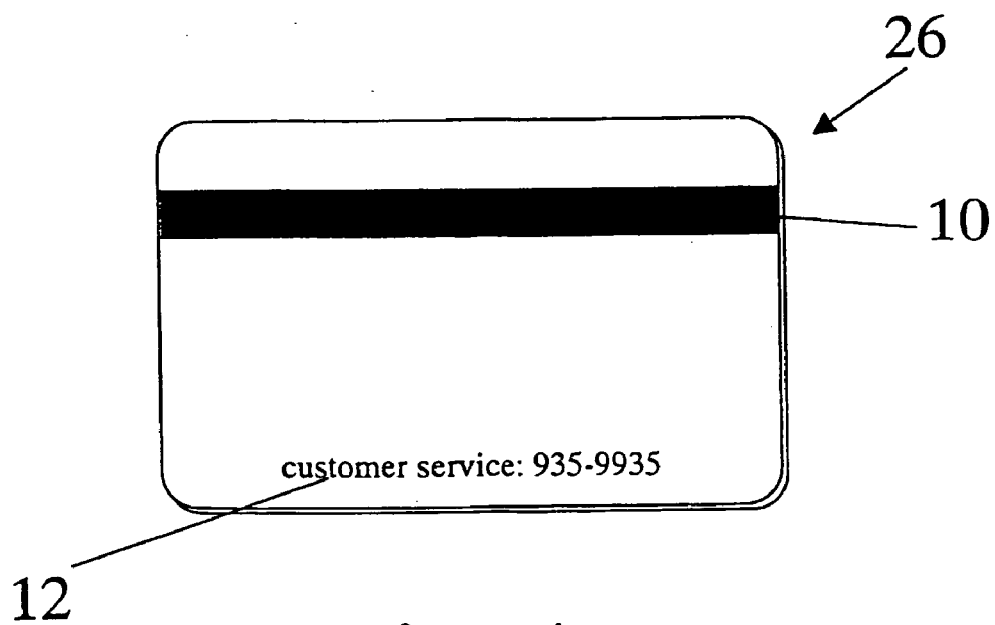
FIG. 4 shows back of the purchasing card of FIG. 3.

FIG. 4 shows the back of the second card 26 with a security strip. Also a customer service phone number 12 for customer inquires can be printed on the card. FIG. 3 (front view of card two) shows a value amount 14 of the pre-paid purchasing card, which come in varying denominations. Also, on the card is printed an expiration date 18 which indicates length of time pre-paid purchasing card is valid.

Figure 2:
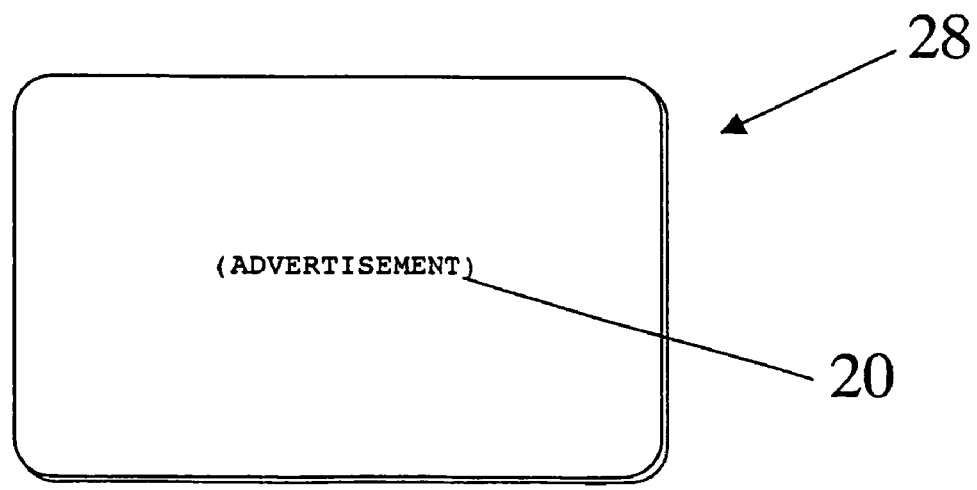
FIG. 2 shows back of the purchasing card of FIG. 1.

FIG. 2 (back view of card one) shows the advertising area 20 of the pre-paid purchasing card, which is available for advertising, to produce additional revenue.

Card one 28 shows a transfer code 24 used for transferring remaining value amount of pre-paid purchasing card to newly purchased, pre-paid purchasing card, as clarified below. Also the transfer code is covered by a removable paint.

Figure 5:
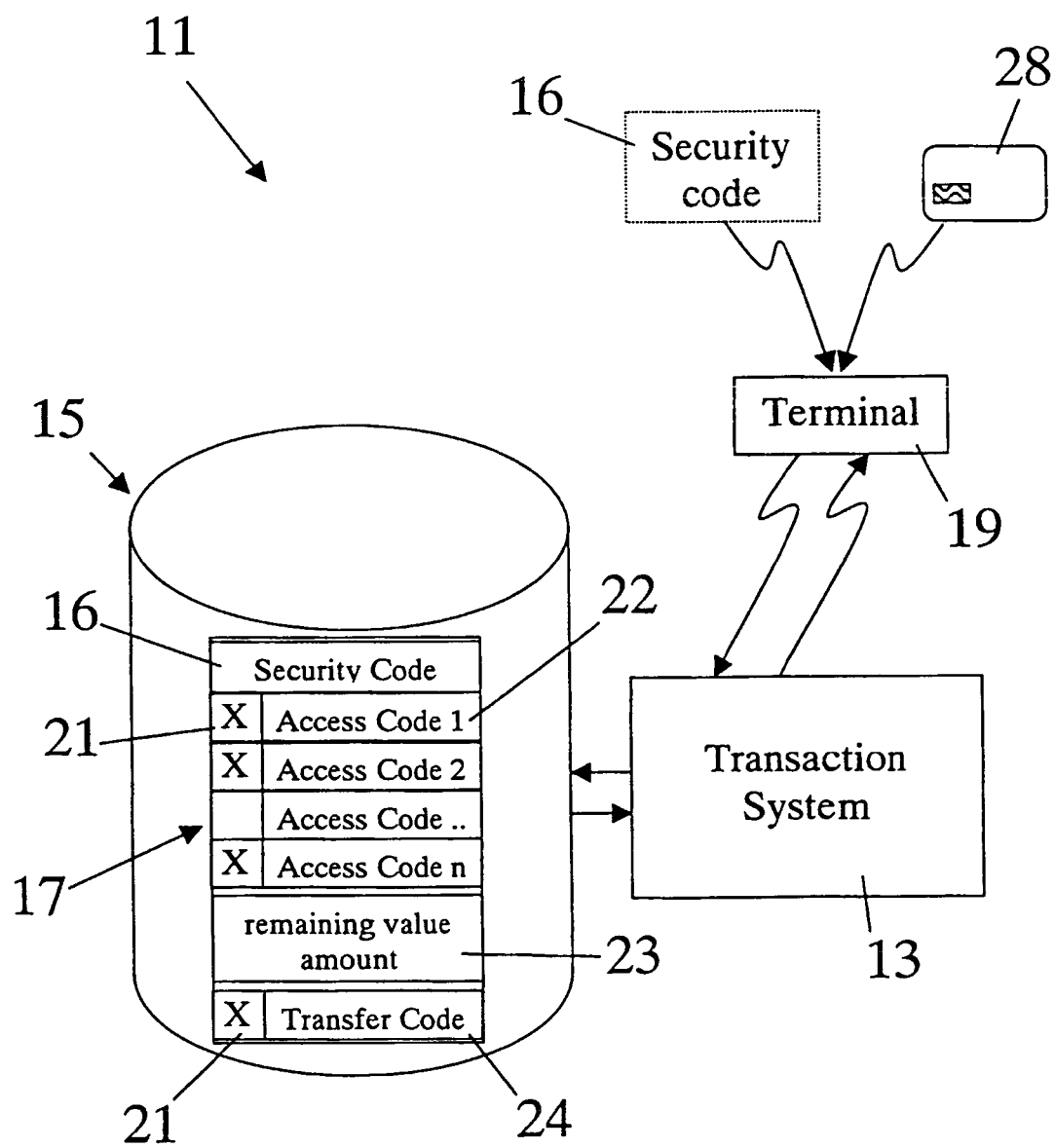
FIG. 5 shows a multiple single use code system according to the invention.

In FIG. 5 is shows a single use code system 11 according to the invention. The system comprises a computerized transaction system 13, terminals 19, archive 15, and pre-paid purchasing cards as disclosed above.

The transaction system stores in the computerized archive 15 a table 17 for each card 28. The table holds the security code, all access codes, transfer code and remaining value amount of the card. A "used flag" is associated with each access code and transfer code.

In use, for making a purchase the user must first scrape and use one of the access codes 22 on card one 28, in order to access, compose or combine the complete code with the security code 16 (on card two 26). The two codes, the composite code or a combination of them, are sent to the transaction system 13 via a merchant terminal 19. For example, the user sends the codes via internet to a seller's site and the seller sends the codes (and the value amount of the requested good or service) to the transaction system. The transaction system checks if the table associated with the security code exists, if the card is valid (flag 21 of the transfer code is not marked) and if the access code is valid (flag 21 of the access code is not marked). Also, the transaction system checks if the remaining value amount associated with the card is equal or higher to value amount required for the purchase. If all checks are satisfied, the transaction system authorizes the payment, decreases the remaining value amount and marks the flag of the access code used.

In this manner, once the user of the pre-paid purchasing card uses one of the access codes 22 from card 28, that access code 22 can not be used again. The access code 22 used, becomes null and void. The access codes 22 do not have to be used in sequential order, the access codes 22 can be used in any order the user chooses to use the access codes 22. With every use of the security code 16 to make a purchase, the value amount 14 of card one 26 is devalued the amount of that particular purchase.

When all the access codes 22 on card 28 are used to access the security code 16 and become null and void, value amount 14 on card 26 (if exists) can be transferred to the next pre-paid purchasing card purchased, using the transfer code 24 on the card 28 in conjunction with the security code 16 on card 26 and a security code on a new card 26. After the transfer of the remaining value amount 14 of card 26 is transferred to a new pre-paid purchasing card the security code 16 of the old card 26 becomes null and void, making the old pre-paid purchasing card null and void after transferring value amount 14 to newly purchased pre-paid purchasing card.

At this point it is clear that the preset purposes have been achieved.

A person who is without a credit card can use a pre-paid purchasing card to make purchases from the Internet, mail-order catalogs, or any merchant which accepts the pre-paid purchasing card. Also, the system according to the invention allows a consumer that does not want to use their credit card to make a purchase from the Internet or a mail-order catalog, or from other merchants, because of concerns their credit card number will be stolen. With the multiple single use code system, a person owning a pre-paid purchasing card can use an access code without risk that the purchasing code number can be intercepted, cloned and reused. A system according to the invention will make it very difficult, if not impossible for someone to steal the codes through the Internet.

Also, the owner of the card can memorize the security code and leave the security code support at home, and carry only card one with them. In this manner, a very high level of security against loss or theft for the consumer that owns a pre-paid purchasing card is obtained. Without having the access and security codes the use of the pre-paid purchasing card is impossible for the person who has stolen the pre-paid purchasing card, or for a person who has found the pre-paid purchasing card.

If the owner loses the pre-paid purchasing card and can't find the card, he can call customer service, and by using the transfer code from card one, in conjunction with the security code of card two, he can transfer the amount of the lost or stolen pre-paid purchasing card to a new pre-paid purchasing card.

After using the pre-paid purchasing card for making purchases, the remaining value amount of the pre-paid purchasing card can be transferred to a newly purchased pre-paid purchasing card.

When a person purchases a pre-paid purchasing card, they have the option of purchasing cards in various value amounts 14 (for example $25, $50, $100, $250, or $500). Pre-paid purchasing cards are available in varying value amounts, allowing the purchaser of the card, to choose a value amount depending on the purchasing needs.

If the owner of the pre-paid purchasing card has questions concerning the pre-paid purchasing card, he can contact customer service using the toll free customer service phone number 12 from card 26 to obtain information in using the pre-paid purchasing card. Also to transfer the value amount 14 of card 26 to another pre-paid purchasing card, by using the transfer code 24 from card 28 in conjunction with the security code 16 from card 26, making the old pre-paid purchasing card null and void after transferring value amount 14 to newly purchased pre-paid purchasing card.

Naturally the above description of an embodiment applying the innovative principles of the present invention is given by way of non-limiting example of said principles within the scope of the exclusive right claimed here and therefore must not be taken as a limitation of the scope of the exclusive right claimed here.

For example the structure of the card or cards can be different in according to specific and practical requirements. Also, data shown on a card in the figures can be on the other card and vice versa or on both cards.

The invention claimed is:

1. A pre-paid purchasing system comprising:
  a pre-paid purchasing card comprising a pre-paid balance; and
  a plurality of single use access codes on the card, wherein each access code is usable to authorize one payment in one transaction for any amount up to the pre-paid balance, and wherein the amount of the one payment is subtracted from the pre-paid balance of the card after use of the access code, and the used access code is rendered null and void.

2. The pre-paid purchasing system as claimed in claim 1, wherein a security code is associated with the plurality of access codes and the security code is supplied or combined with each access code for authorizing said payment.

3. The pre-paid purchasing system as claimed in claim 1, wherein the security code is at least one of stored and printed on another support.

4. The pre-paid purchasing system as claimed in claim 3, wherein the other support is a second card.

5. The pre-paid purchasing system as claimed in claim 1, wherein a transfer code on the card exists for authorizing transfer of a remaining pre-paid balance from the card to another card carrying another pre-paid balance with which the remaining pre-paid balance is combined.

6. The pre-paid purchasing system as claimed in claim 1, wherein each access code is printed on the card and shadowed by a layer of removable scrape paint.

7. The pre-paid purchasing system as claimed in claim 1, further comprising:
  a transaction system receiving said codes from the card via a transaction terminal, the transaction system comprising a computerized archive in which a table for each card is stored, the table comprising at least the card security code, the remaining amount of the card, all card access codes, and a flag associated with each access code, wherein after use of an access code for a payment, the amount of the payment being decreased from the remaining amount in the table and the flag corresponding to the used access code being are marked to indicate that the access code has become null and void.

8. The pre-paid purchasing system as claimed in claim 7, wherein the table comprises a transfer code for enabling transfer of the remaining amount to another card and a flag associated with the transfer code, wherein after transfer said flag is being marked to indicate that the card has become null and void.

9. A method for activating a transaction for purchasing goods and services from the Internet, mail-order catalogs, or any merchant, comprising the steps of:
  supplying a security code and at least one single use access code selected from a plurality of single use access codes provided on a pre-paid card comprising a pre-paid amount representing an initial pre-paid balance, wherein each of the at least one single-use access code can authorize one payment in one transaction for any amount up to a pre-paid balance remaining;
  asking for said single use access code and said security code or a combination of them following a request of payment transaction for a purchase, the request including a transaction amount;
  authorizing said purchase payment if the single use access code and the security code are associated with a pre-paid balance remaining that is equal to or higher than the payment transaction amount required for the purchase;
  decreasing the pre-paid balance remaining by the payment transaction amount associated with said single-use access code and security code; and
  marking the single use access code after use thereof to indicate that said access code has become null and void.

10. The method as claimed in claim 9, wherein the single use access codes associated with a same security code are a plurality and wherein the security code becomes null and void after all access codes of the plurality have been used or after the pre-paid amount associated with said security code has become zero.

11. The method as claimed in claim 9, wherein a transfer code is associated with the security code and the method further comprises:
  checking the reception of a transfer code together with the security code and, upon receipt thereof;
  adding the pre-paid amount associated with the security code to an amount associated with another security code, and
  annulling the amount associated with the security code whose transfer code is received.

12. The method as claimed in claim 9, wherein the single use access code is printed on the pre-paid card and the security code is on another support.

13. The method as claimed in claim 12, wherein the said support is a second card.

14. The method as claimed in claim 12, wherein the single use access code is shadowed by a layer of removable scrape paint.

15. A pre-paid purchasing system comprising:
  a pre-paid purchasing card comprising a pre-paid balance; and
  a plurality of single use access codes on the card, wherein each single use access code is usable to authorize one payment in one transaction for any amount up to the pre-paid balance, and wherein the amount of the one payment is subtracted from the pre-paid balance of the card after use the single use access code, and the used single use access code is rendered null and void;
the pre-paid purchasing system executing a method comprising:

supplying a security code and at least one single use access code associated with a pre-paid amount representing an initial pre-paid balance, wherein each of the at least one single-use access code can authorize one payment in one transaction for any amount up to a pre-paid balance remaining;

asking for said single use access code and said security code or a combination of them following a request of payment transaction for a purchase, the request including a transaction amount;

authorizing said purchase payment if the single use access code and the security code are associated with a pre-paid balance remaining that is equal to or higher than the payment transaction amount required for the purchase;

decreasing the pre-paid balance remaining by the payment transaction amount associated with said single-use access code and security code; and marking the single use access code after use thereof to indicate that said access code has become null and void.

* * * * *